US007779472B1

(12) United States Patent
Lou

(10) Patent No.: US 7,779,472 B1
(45) Date of Patent: Aug. 17, 2010

(54) APPLICATION BEHAVIOR BASED MALWARE DETECTION

(75) Inventor: Vic Lou, Chung Ho (TW)

(73) Assignee: Trend Micro, Inc., Tokyo (JP)

( * ) Notice: Subject to any disclaimer, the term of this patent is extended or adjusted under 35 U.S.C. 154(b) by 981 days.

(21) Appl. No.: 11/247,349

(22) Filed: Oct. 11, 2005

(51) Int. Cl.
*G06F 21/00* (2006.01)

(52) U.S. Cl. ............................. 726/24; 726/22; 726/23; 726/25

(58) Field of Classification Search ............. 726/22-25, 726/26; 713/200; 714/38; 719/328; 703/23, 703/27
See application file for complete search history.

(56) References Cited

U.S. PATENT DOCUMENTS

| | | | | |
|---|---|---|---|---|
| 6,161,130 | A | 12/2000 | Horvitz et al. | |
| 6,973,577 | B1 | 12/2005 | Kouznetsov | |
| 7,039,830 | B2 | 5/2006 | Qin | |
| 7,096,368 | B2 * | 8/2006 | Kouznetsov et al. | 713/189 |
| 7,103,913 | B2 | 9/2006 | Arnold et al. | |
| 7,181,583 | B2 | 2/2007 | Saika | |
| 7,188,369 | B2 | 3/2007 | Ho et al. | |
| 7,308,449 | B2 * | 12/2007 | Fairweather | 1/1 |
| 7,376,970 | B2 | 5/2008 | Marinescu | |
| 7,409,791 | B2 | 8/2008 | Armstrong et al. | |
| 2003/0187853 | A1 | 10/2003 | Hensely et al. | |
| 2004/0015712 | A1 * | 1/2004 | Szor | 713/200 |
| 2004/0034813 | A1 | 2/2004 | Chaboud et al. | |
| 2004/0098607 | A1 * | 5/2004 | Alagna et al. | 713/200 |
| 2004/0199827 | A1 * | 10/2004 | Muttik et al. | 714/38 |
| 2005/0216759 | A1 * | 9/2005 | Rothman et al. | 713/200 |
| 2006/0047931 | A1 | 3/2006 | Saika | |
| 2006/0136720 | A1 | 6/2006 | Armstrong et al. | |
| 2006/0136771 | A1 | 6/2006 | Watanabe | |
| 2006/0137010 | A1 | 6/2006 | Kramer et al. | |

OTHER PUBLICATIONS

Office Action dated Feb. 18, 2009 in U.S. Appl. No. 11/181,320.
Office Action dated Apr. 2, 2009 in U.S. Appl. No. 11/204,567.
Office Action dated Sep. 15, 2009 in U.S. Appl. No. 11/181,320.

* cited by examiner

*Primary Examiner*—Carl Colin
*Assistant Examiner*—Helai Salehi
(74) *Attorney, Agent, or Firm*—Beyer Law Group LLP

(57) ABSTRACT

An executable file is loaded into a virtual machine arranged to emulate the instructions of said executable file. The virtual machine keeps track of application programming interfaces (APIs) used by the executable file during emulation. The executable file is scanned to determine names of (APIs) used. Behavior flags are set if certain conditions occur within the executable file. The APIs determined during emulation and during scanning are compared with a set of known behaviors. A match of the APIs and the known behaviors indicates a high risk of malware. A determination of malware being present is based upon any matches and any behavior flags that are set.

29 Claims, 12 Drawing Sheets

#VER = n —— 304

#LEN —— 308

#CRC —— 312

#FORCE_DISABLE —— 316

#CHECK_FIRSTEP —— 320

#CHECK_NOVIR_BUTDUMP —— 324

#CHECK_VIR_SEARCHAPI_FROM_MEM —— 328

#CHECK_CALL_RING_0 —— 332

#USE_METASCAN —— 336

HEADER

300

```
#APILIST.BGN

"< API Name String >", < API Type >, < Argument Quantity >

#APILIST.END
```

API LIST

*FIG. 4*

| | | |
|---|---|---|
| TYPE = 0X80000000 | bit 31 | Excluding API |
| TYPE = 0X4000000 | bit 26 | Security |
| TYPE = 0X2000000 | bit 25 | Download Object |
| TYPE = 0X1000000 | bit 24 | Device Driver |
| TYPE = 0X800000 | bit 23 | Mail |
| TYPE = 0X400000 | bit 22 | Profile I/O |
| TYPE = 0X200000 | bit 21 | System Information |
| TYPE = 0X100000 | bit 20 | Resource |
| TYPE = 0X80000 | bit 19 | Console Mode |
| TYPE = 0X40000 | bit 18 | Mutex |
| TYPE = 0X20000 | bit 17 | Memory Allocate |
| TYPE = 0X10000 | bit 16 | Environment Strings I/P |
| TYPE = 0X8000 | bit 15 | Critical Section I/O |
| TYPE = 0X4000 | bit 14 | Time I/O |
| TYPE = 0X2000 | bit 13 | Shell Execute |
| TYPE = 0X1000 | bit 12 | Net I/O |
| TYPE = 0X800 | bit 11 | Net Search |
| TYPE = 0X400 | bit 10 | Service I/O |
| TYPE = 0X200 | bit 9 | Service Search |
| TYPE = 0X100 | bit 8 | Registry I/O |
| TYPE = 0X80 | bit 7 | Registry Searching |
| TYPE = 0X40 | bit 6 | Process I/O |
| TYPE = 0X20 | bit 5 | Process Search |
| TYPE = 0X10 | bit 4 | API searching |
| TYPE = 0X08 | bit 3 | Load Library |
| TYPE = 0X04 | bit 2 | Set/Get File Attribute |
| TYPE = 0X02 | bit 1 | File/Directory I/O |
| TYPE = 0X01 | bit 0 | Directory/File Searching |
| TYPE = 0X00 | bit ALL | Get Version |
| 408 | 412 | 416 |

API Types

| | |
|---|---|
| #APILIST.BGN | |
| "GetVersion", | 0x00, 0x00 |
| "GetVersionExA", | 0x00, 0x01 |
| "GetVersionExW", | 0x00, 0x01 |
| "FindFirstFileA", | 0x01, 0x02 |
| "FindFirstFileW", | 0x01, 0x02 |
| "FindFirstFileExA", | 0x01, 0x06 |
| "FindFirstFileExW", | 0x01, 0x06 |
| "FindNextFileA", | 0x01, 0x02 |
| "FindNextFileW", | 0x01, 0x02 |
| "FindClose", | 0x01, 0x01 |
| "SearchPathA", | 0x01, 0x06 |
| "SearchPathW", | 0x01, 0x06 |
| "GetCurrentDirectoryA", | 0x01, 0x02 |
| "GetCurrentDirectoryW", | 0x01, 0x02 |
| "SetCurrentDirectoryA", | 0x01, 0x01 |
| "SetCurrentDirectoryW", | 0x01, 0x01 |
| "GetWindowsDirectoryA", | 0x01, 0x02 |
| "GetWindowsDirectoryW", | 0x01, 0x02 |
| "GetSystemDirectoryA", | 0x01, 0x02 |
| "GetSystemDirectoryW", | 0x01, 0x02 |
| "RemoveDirectoryA", | 0x02, 0x01 |
| "RemoveDirectoryW", | 0x02, 0x01 |
| "_lwrite", | 0x02, 0x03 |
| "WriteFile", | 0x02, 0x05 |
| "WriteFileEx", | 0x02, 0x05 |
| "OpenFile", | 0x02, 0x03 |
| "_lopen", | 0x02, 0x02 |
| "OpenFileMappingA", | 0x02, 0x03 |
| "OpenFileMappingW", | 0x02, 0x03 |
| "CreateFileA", | 0x02, 0x07 |
| "CreateFileW", | 0x02, 0x07 |
| "CreateFileMappingA", | 0x02, 0x06 |
| "CreateFileMappingW", | 0x02, 0x06 |
| "MoveFileA", | 0x02, 0x02 |
| "MoveFileW", | 0x02, 0x02 |
| "MoveFileExA", | 0x02, 0x03 |
| "MoveFileExW", | 0x02, 0x03 |
| "CopyFileA", | 0x02, 0x03 |
| "CopyFileW", | 0x02, 0x03 |
| "CopyFileExA", | 0x02, 0x06 |
| "CopyFileExW", | 0x02, 0x06 |
| "MapViewOfFile", | 0x02, 0x05 |
| "MapViewOfFileEx", | 0x02, 0x06 |
| "DeleteFileA", | 0x02, 0x01 |
| "DeleteFileW", | 0x02, 0x01 |
| "_lread", | 0x02, 0x03 |
| "ReadFile", | 0x02, 0x05 |
| "ReadFileEx", | 0x02, 0x05 |
| "SetFilePointer", | 0x02, 0x04 |
| "SetFilePointerEx", | 0x02, 0x04 |
| "fopen", | 0x02, 0x02 |
| "fread", | 0x02, 0x04 |
| "_mkdir", | 0x02, 0x01 |
| "SetFileAttributesA", | 0x04, 0x02 |
| "SetFileAttributesW", | 0x04, 0x02 |
| "GetFileAttributesA", | 0x04, 0x01 |

API List

*FIG. 6A*

| | |
|---|---|
| "GetFileAttributesW", | 0x04, 0x01 |
| "GetFileAttributesExA", | 0x04, 0x03 |
| "GetFileAttributesExW", | 0x04, 0x03 |
| "LoadLibraryA", | 0x08, 0x01 |
| "LoadLibraryW", | 0x08, 0x01 |
| "LoadLibraryExA", | 0x08, 0x03 |
| "LoadLibraryExW", | 0x08, 0x03 |
| "GetModuleHandlerA", | 0x08, 0x01 |
| "GetModuleHandleW", | 0x08, 0x01 |
| "GetProcAddress", | 0x10, 0x02 |
| "GetCurrentProcess", | 0x20, 0x00 |
| "CreateProcessA", | 0x40, 0x0A |
| "CreateProcessW", | 0x40, 0x0A |
| "OpenProcessToken", | 0x40, 0x03 |
| "ReadProcessMemory", | 0x40, 0x05 |
| "WriteProcessMemory", | 0x40, 0x05 |
| "RegisterServiceProcess", | 0x40, 0x02 |
| "RegQueryValueA", | 0x80, 0x04 |
| "RegQueryValueW", | 0x80, 0x04 |
| "RegQueryValueExA", | 0x80, 0x06 |
| "RegQueryValueExW", | 0x80, 0x06 |
| "RegConnectRegistryA", | 0x80, 0x03 |
| "RegConnectRegistryW", | 0x80, 0x03 |
| "RegEnumKeyA", | 0x80, 0x04 |
| "RegEnumKeyW", | 0x80, 0x04 |
| "RegEnumKeyExA", | 0x80, 0x08 |
| "RegEnumKeyExW", | 0x80, 0x08 |
| "RegEnumValueA", | 0x80, 0x08 |
| "RegEnumValueW", | 0x80, 0x08 |
| "RegCreateKeyA", | 0x100, 0x03 |
| "RegCreateKeyW", | 0x100, 0x03 |
| "RegCreateKeyExA", | 0x100, 0x09 |
| "RegCreateKeyExW", | 0x100, 0x09 |
| "RegSetValueA", | 0x100, 0x05 |
| "RegSetValueW", | 0x100, 0x05 |
| "RegSetValueExA", | 0x100, 0x06 |
| "RegSetValueExW", | 0x100, 0x06 |
| "RegOpenKeyA", | 0x100, 0x03 |
| "RegOpenKeyW", | 0x100, 0x03 |
| "RegOpenKeyExA", | 0x100, 0x05 |
| "RegOpenKeyExW", | 0x100, 0x05 |
| "RegDeleteValueA", | 0x100, 0x02 |
| "RegDeleteValueW", | 0x100, 0x02 |
| "RegCloseKey", | 0x100, 0x01 |
| "OpenSCManagerA", | 0x200, 0x03 |
| "OpenSCManagerW", | 0x200, 0x03 |
| "CreateServiceA", | 0x200, 0x0D |
| "StartServiceA", | 0x400, 0x03 |
| "StartServiceW", | 0x400, 0x03 |
| "OpenServiceA", | 0x400, 0x03 |
| "OpenServiceW", | 0x400, 0x03 |
| "CreateServiceA", | 0x400, 0x0d |
| "ControlService", | 0x400, 0x03 |
| "DeleteService", | 0x400, 0x01 |
| "WNetOpenEnumA", | 0x800, 0x05 |
| "WNetOpenEnumW", | 0x800, 0x05 |
| "WNetEnumResourceA", | 0x800, 0x04 |

*FIG. 6B*

| | |
|---|---|
| "WNetEnumResourceW", | 0x800, 0x04 |
| "WNetCloseEnum", | 0x800, 0x01 |
| "InternetAutodial", | 0x800, 0x02 |
| "InternetGetConnectedState", | 0x800, 0x02 |
| "WSAStartup", | 0x800, 0x02 |
| "WASAocketA", | 0x800, 0x06 |
| "socket", | 0x800, 0x03 |
| "WNetAddConnection2A", | 0x800, 0x04 |
| "inet_addr", | 0x800, 0x01 |
| "inet_ntoa", | 0x800, 0x01 |
| "setsockopt", | 0x800, 0x05 |
| "getpeername", | 0x800, 0x03 |
| "GetNetworkParams", | 0x800, 0x02 |
| "WNetGetConnectionA", | 0x800, 0x03 |
| "gethostname", | 0x1000, 0x02 |
| "getserbyname", | 0x1000, 0x02 |
| "gethostbyname", | 0x1000, 0x02 |
| "send", | 0x1000, 0x04 |
| "recv", | 0x1000, 0x04 |
| "connect", | 0x1000, 0x03 |
| "NetShareDel", | 0x1000, 0x03 |
| "NetShareAdd", | 0x1000, 0x04 |
| "WSAIoctl", | 0x1000, 0x09 |
| "InternetOpenA", | 0x1000, 0x05 |
| "InternetOpenUrlA", | 0x1000, 0x06 |
| "InternetReadFile", | 0x1000, 0x04 |
| "ioctlsocket", | 0x1000, 0x03 |
| "recvfrom", | 0x1000, 0x06 |
| "sendto", | 0x1000, 0x06 |
| "bind", | 0x1000, 0x03 |
| "InternetReadFile", | 0x1000, 0x04 |
| "ShellExecuteA", | 0x2000, 0x06 |
| "ShellExecuteW", | 0x2000, 0x06 |
| "ShellExecuteExA", | 0x2000, 0x06 |
| "ShellExecuteExW", | 0x2000, 0x06 |
| "WinExec", | 0x2000, 0x02 |
| "GetSystemTimeAsFileTime", | 0x4000, 0x01 |
| "SystemTimeToFileTime", | 0x4000, 0x02 |
| "GetTickCount", | 0x4000, 0x01 |
| "GetLocalTime", | 0x4000, 0x01 |
| "GetSystemTime", | 0x4000, 0x01 |
| "GetTimeZoneInformatin", | 0x4000, 0x01 |
| "SetTimer", | 0x4000, 0x02 |
| "rand", | 0x4000, 0x00 |
| "EnumCalendarInfoA", | 0x4000, 0x04 |
| "DeleteCriticalSection", | 0x8000, 0x01 |
| "EnterCritcalSectin", | 0x8000, 0x01 |
| "LeaveCritcalSeciton", | 0x8000, 0x01 |
| "FreeEnvironmentStringsA", | 0x10000, 0x01 |
| "FreeEnvironmentStringsW", | 0x10000, 0x01 |
| "GenEnvironmentStringsA", | 0x10000, 0x00 |
| "GenEnvironmentStringsW", | 0x10000, 0x00 |
| "SetEnvironmentVariableA", | 0x10000, 0x02 |
| "SetEnvironmentVariableW", | 0x10000, 0x02 |
| "GlobalLock", | 0x20000, 0x01 |
| "GlobalAlloc", | 0x20000, 0x02 |
| "GlobalUnlock", | 0x20000, 0x01 |

FIG. 6C

```
"GlobalFree",                          0x20000, 0x01
"HeapFree",                            0x20000, 0x03
"HeapAlloc",                           0x20000, 0x03
"HeapCreate",                          0x20000, 0x03
"VirtualAlloc",                        0x20000, 0x04
"CreateMutexA",                        0x40000, 0x03
"CreateMutexW",                        0x40000, 0x03
"ReleaseMutex",                        0x40000, 0x01
"_mtlock",                             0x40000, 0x00
"SetConsoleMode",                      0x80000, 0x02
"GetConsoleMode",                      0x80000, 0x02
"WriteConsoleA",                       0x80000, 0x05
"SetConsoleCtrlHandler",               0x80000, 0x02
:FindResourceW",                       0x100000, 0x03
"LoadResource",                        0x100000, 0x02
"LockResource",                        0x100000, 0x01
"GetComputerNameA",                    0x200000, 0x02
"GetComputerNameW",                    0x200000, 0x02
"GetSystemInfo",                       0x200000, 0x01
"GlobalMemoryStatus",                  0x200000, 0x01
"GetProfileIntA",                      0x400000, 0x03
"WriteProfileStringA",                 0x400000, 0x03
"WritePrivateProfileStringA",          0x400000, 0x04
"GetPrivateProfileStringA",            0x400000, 0x06
"GetProfileStringA",                   0x400000, 0x03
"MAPISendMail",                        0x800000, 0x05
"DeviceIoControl",                     0x1000000, 0x08
"EnumDeviceDrivers",                   0x1000000, 0x03
"GetDeviceCaps",                       0x1000000, 0x02
"URLDownloadToFileA",                  0x2000000, 0x05
"AddAccessAllowedAce",                 0x4000000, 0x04
"??1?$allocator@D@_STL@@QAE@XZ",0x80000000, 0x00
"SPXBuild",                            0x80000000, 0x00
"?FileExists@Path@@QAEHXZ",            0x80000000, 0x00
#APILIST.END
```

FIG. 6D

Dynamic API Behavior Count

Static API Behavior Count

```
#PETRARULE.BGN

< Rule ID >,  < Rule >

#PETRARULE.END
```
— 430

Rule Set List

```
#PROTERMINATE.BGN

< ID >,  < API String >

#PROTERMINATE.END
```
— 440

Program Terminate List

```
#EXECOMPRESS.BGN

< ID >,  < Compressor String >

#EXECOMPRESS.END
```
— 450

Compress List

```
#PETRAPRULE.BGN
1,    0x3
2,    0x3008
3,    0x411f
4,    0x4918
5,    0x2495b
#PETRAPRULE.END
```

504

Rule Set Example

FIG. 12

```
#PROTERMINATE.BGN
1,    "ExitProcess"
2,    "exit"
3,    "_exit"
4,    "_except_handler2"
5,    "_except_handler3"
6,    "TerminateProcess"
#PROTERMINATE.END
```

508

Program Terminate Example

FIG. 13

```
#EXECOMPRESS.BGN
1,    "UPX0"
2,    ".PE-PROT"
3,    "PELOCKnt"
4,    ".petite"
5,    ".PEpsi"
6,    ".FORTH"
7,    "R!SC"
8,    "pec1"
9,    "????????"
10,   ".madmat"
11,   ".winamp"
12,   ".packed"
13,   ".fuckMut"
14,   ".Shared"
15,   ".WWP32"
16,   "_TEXT_HA"
#EXECOMPRESS.END
```

512

Compress Example

FIG. 14

APPLICATION BEHAVIOR BASED MALWARE DETECTION

FIELD OF THE INVENTION

The present invention relates generally to addressing malicious software in computer systems. More specifically, the present invention relates to the detection of malicious software based upon an application's behavior.

BACKGROUND OF THE INVENTION

Currently, it is common for malicious software such as computer viruses, worms, spyware, etc., to affect a computer such that it will not behave as expected. Malicious software can delete files, slow computer performance, clog e-mail accounts, steal confidential information, cause computer crashes, allow unauthorized access and generally perform other actions that are undesirable or not expected by the user of the computer.

Current technology allows computer users to create backups of their computer systems and of their files and to restore their computer systems and files in the event of a catastrophic failure such as a loss of power, a hard drive crash or a system operation failure. Assuming that the user had performed a backup prior to the failure, it can be straightforward to restore their computer system and files to a state prior to the computer failure. Unfortunately, these prior art techniques are not effective when dealing with infection of a computer by malicious software. It is important to be able to detect such malware when it first becomes present in a computer system, or better yet, before it can be transferred to a user's computer.

One prior art technique for detecting a virus is known as the signature matching technique. This technique is able to detect known malware using a predefined pattern database that compares a known pattern (the virus signature) with a suspected virus in order to perform detection. This technique, though, is unable to handle new, unknown malware. Further, although this technique works well with traditional types of computer viruses, for example, it does not work well with more recent, popular malicious software such as "Mass Mailer" and self-compressed viruses. Other prior art techniques use predefined rules or heuristics to detect unknown malware. These rules take into account some characteristics of the malware, but these rules need to be written down manually and are hard to maintain. Further, it can be very time-consuming and difficult to attempt to record all of the rules necessary to detect many different kinds of malware. Because the number of rules is often limited, this technique cannot achieve both a high detection rate and a low false-positive rate.

The detection of computer worms can be especially problematic. Prior art techniques rely upon creating a pattern file for a newly detected worms and for updating that file as a new worms are found. But a worm is inherently different from other types of computer viruses in that a worm can generate many variants very quickly. It can be extremely difficult to generate the signature files needed to detect all of the new variants of a computer worm.

Given the difficulties in the prior art with detecting malware in general, and computer worms in particular, a new technique is desired.

SUMMARY OF THE INVENTION

To achieve the foregoing, and in accordance with the purpose of the present invention, a heuristic technique is disclosed that allows for the detection of malware in general and computer worms in particular.

A method of detecting malware begins by first receiving a suspect executable computer file. Next, the executable file is loaded into a virtual machine arranged to emulate the instructions of the executable file. The instructions of the executable file are emulated using the virtual machine. A behavior flag if any suspect conditions occur during emulation. The virtual machine keeps track of application programming interfaces (APIs) used by the executable file during emulation. The APIs used are compared with a set of known behaviors, each known behavior includes a list of APIs used by malware. Finally, a determination is made that the executable file is malware based upon the results of the comparison.

In an alternative embodiment, an executable file is loaded into a virtual machine arranged to emulate the instructions of said executable file. The virtual machine keeps track of application programming interfaces (APIs) used by the executable file during emulation. The executable file is scanned to determine names of (APIs) used. Behavior flags are set if certain conditions occur within the executable file. The APIs determined during emulation and during scanning are compared with a set of known behaviors. A match of the APIs and the known behaviors indicates a high risk of malware. A determination of malware being present is based upon any matches and any behavior flags that are set.

BRIEF DESCRIPTION OF THE DRAWINGS

The invention, together with further advantages thereof, may best be understood by reference to the following description taken in conjunction with the accompanying drawings in which:

FIG. 4 shows the format of an API list that may be embodied in a database used in conjunction with the virtual machine of the present invention (for example, in the Rule file).

FIG. 5 shows a list of API types that have been found to be indicative of malware.

FIGS. 6A-6D illustrate an embodiment of an API list of the present invention.

FIG. 12 is a rule set example that lists five example rules.

FIG. 13 is an example of a list of terminating API names.

FIG. 14 is a list of markers used in many of the Packer programs.

DETAILED DESCRIPTION OF THE INVENTION

Figure 1:
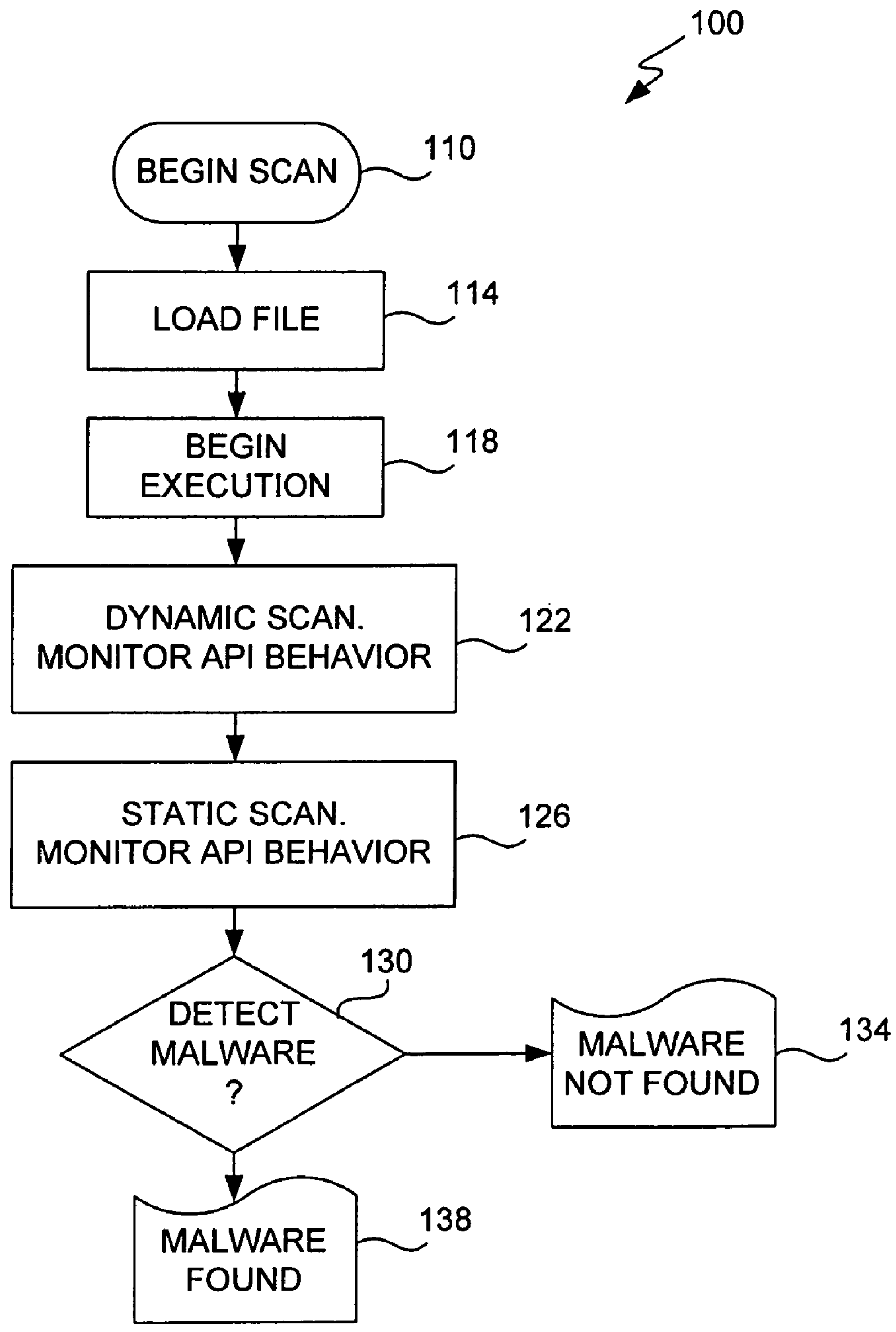
FIG. 1 is a flow diagram describing operation of the present invention.

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not perfect in that many groups overlap. For example, commercially available "anti-virus" software is designed to scan a computer for viruses and worms, as well as other malicious software. Of course, later developed software not currently known may also fall within the definition of malware.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another. Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). An example of a Trojan horse is a program called Gpcoder that encrypts documents, spreadsheets and database files on a user's computer. The program then leaves the user a message about how to obtain a program for $200 that would remove the encryption. A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

Spyware is a piece of software that collects and sends information (such as browsing patterns or credit card numbers) about users and the results of their computer activity without explicit notification. Spyware usually works and spreads like Trojan horses. The category of spyware may also include adware that a user deems undesirable. Sometimes the term spyware is used to refer to more traditional malicious software such as viruses and worms. A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. A dialer is a program that replaces the telephone number in a modem's dial-up connection with a long-distance number (often out of the country) in order to run up telephone charges on pay-per-dial numbers, or dials out at night to send key logger or other information to a hacker. Software known as URL injection software modifies a browser's behavior with respect to some or all domains. It modifies the URL submitted to the server to profit from a given scheme by the content provider of the given domain. This activity is often transparent to the user.

Another type of malicious software performs extortion on a vast scale, such as threatening to take down an Internet web site (such as a gambling web site) during time sensitive events. An attacker would attempt to shut down an Internet site by using thousands of so-called "zombie" or "robot" personal computers that have been secretly taken over by malicious software. These computers could be used to simultaneously deluge a web site with incoming messages that would paralyze the web site.

The present invention is suitable for use with a wide variety of types and formats of malware. The below description provides an example of the use of the invention with malware written in the portable executable (PE) format. As is known in the art, the portable executable format is an executable file format used in 32-bit and 64-bit versions of Microsoft operating systems. The portable executable format is a modified version of the UNIX COFF file format. Of course, the present invention applies to computer files in other formats as well.

It is realized that certain types of malicious software embed specific kinds of application behavior or strategy within the software itself. For example, a Mass Mailer virus will implant itself in an SMTP engine in order to propagate itself. Behavior analysis of the suspect software is based on the software's use of various application programming interfaces (API's). The present invention collects information about the API's used as well as using a variety of virus behavior sensors. The present invention implements heuristic rules for detection of malware; it can correctly parse and identify unknown new viruses without the need for manual analysis.

As is known in the art, an application programming interface (API) is generally a set of software routines and protocols used by an application program as a means for gaining access to another specific application or to an operating system. An API allows an application program to request and carry out lower-level services implemented by a computer's operating system.

System Flow Diagram

FIG. 1 is a flow diagram describing operation of the present invention. In step 110 the scan engine of the present invention begins a scan of suspected malware. The scan engine of the present invention implements a virtual machine that can emulate a CPU and execute the instructions contained within the suspect computer file and monitor their actions. Implementation of a virtual machine is known to those of skill in the art and details specific to this implementation will be explained below.

In this example, the suspect computer file is in the PE format and is an executable file or ".exe" file. The suspect computer file may originate from a wide variety of locations. By way of example, the suspect computer file may arrive as an e-mail attachment, as a file on a medium such as a computer disk, or by being downloaded using a protocol such as FTP or HTTP.

Figure 2:
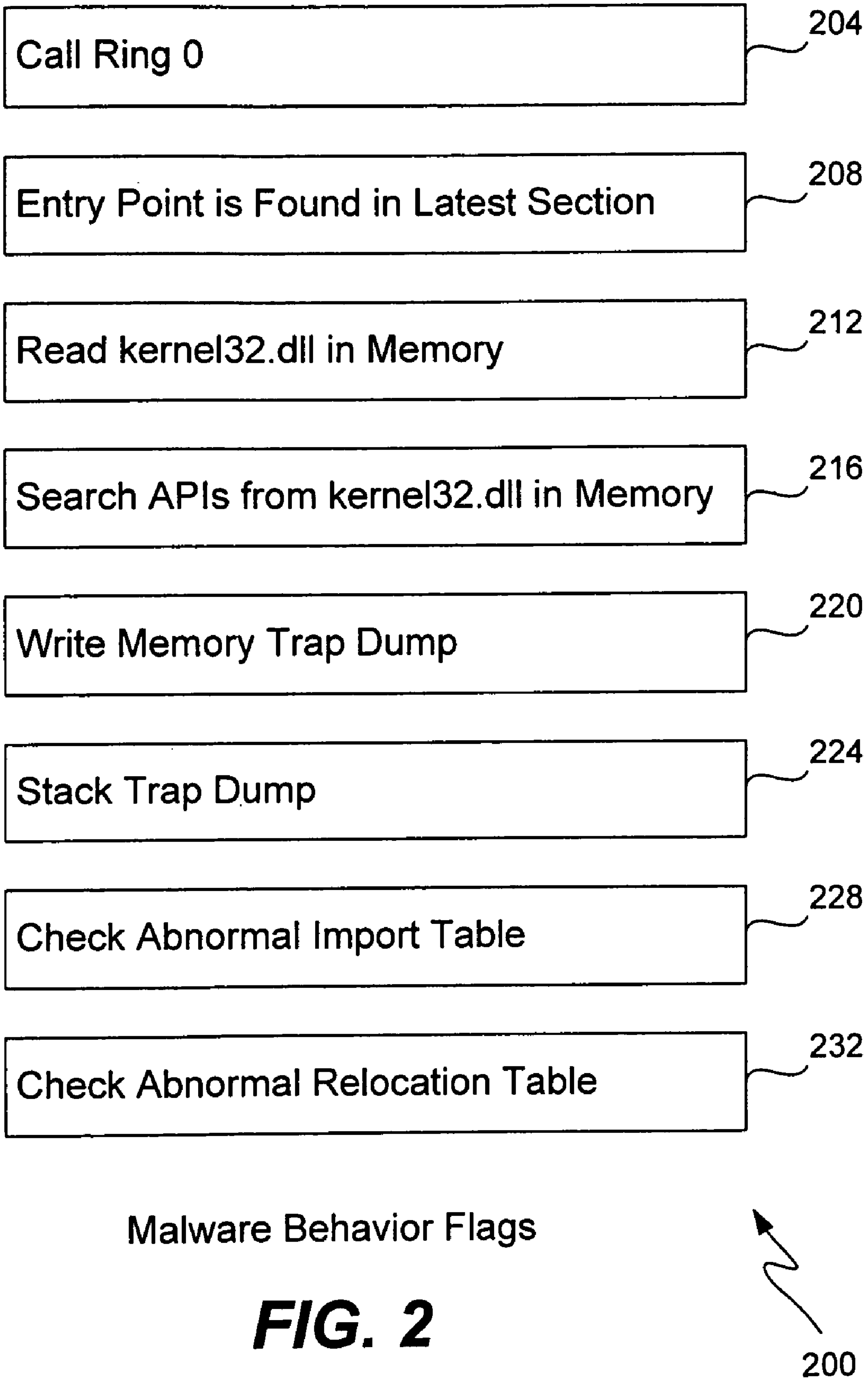
FIG. 2 shows a variety of malware behavior flags that are used to indicate whether a particular file might be malware.
Figure 3:
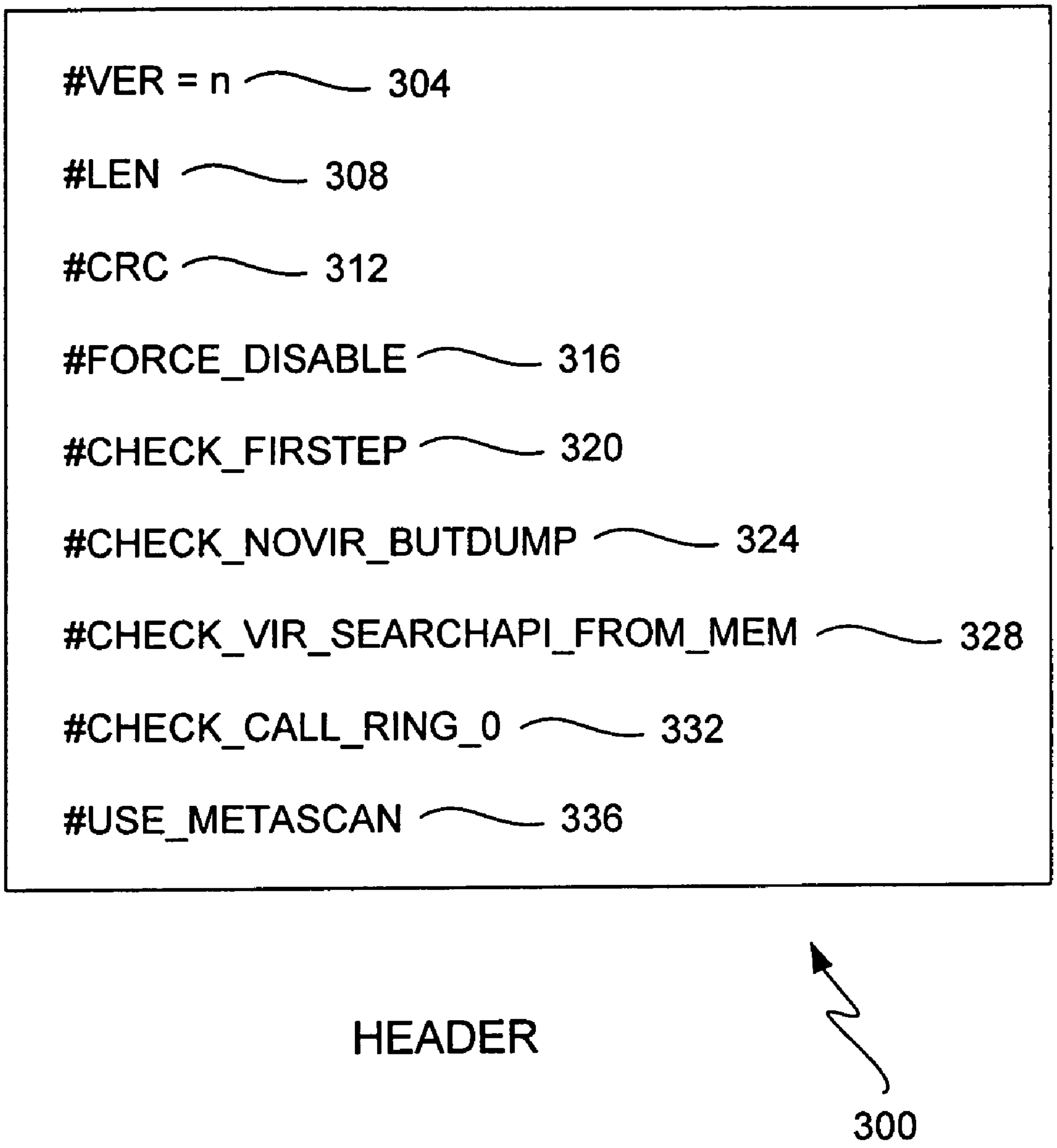
FIG. 3 shows the Rule file header that contains information and flags used by the scan engine to process a suspect computer file.

Also available to the scan engine are numerous flags, data structures, tables and rules that assist with determining whether a suspect computer file contains malware or not. In one embodiment, this information is stored in a single file called a "Rule" file, although the information may be stored in separate locations as well. FIG. 2 described below shows various malware behavior flags 200 that might be set. FIG. 3 shows the Rule file header 300 that contains information and flags used by the scan engine to process a suspect computer file. Fields 304, 308 and 312 are not used in the present invention.

Field 316 is set to disable malware detection by pattern when the present invention is in use so that no false positives are generated. Fields 320-336 are used to turn on or off use of the malware behavior flags 200. When the scan engine reads a pattern, the scan engine will also receive header 300. Through use of these flags, a service engineer can turn on or off their functionalities if any serious false positives develop related to those flags.

In step 114 the suspect computer file is loaded into the scan engine using a PE Loader function; the PE header of the suspect file is analyzed in order to obtain the relevant data from the header. For example, the results of this step include obtaining the section information, the program entry point, the import table data entry, and the image base.

Due to backwards compatible issues, DOS ".exe" file headers can be found in front of the PE header. The DOS ".exe" header starts from the signature "MZ" that contains four bytes. Following this value is the PE header starting from the signature "PE". The PE loader uses this information to determine the entry point of the PE header. Following the PE signature are fields describing the entry point, number of sections, and other resources. For example, the PE loader retrieves the fields such as PE header signature, number of sections, entry point, image base, import table RVA and import table size. These fields will be used later during execution of the scan engine.

In step 118 the scan engine begins execution and analysis of the suspect computer file. As mentioned earlier, the scan engine is a virtual machine that emulates a CPU. The virtual machine begins parsing binary code of the suspect computer file from its entry point, the entry point being calculated using the PE Loader function. Upon execution, the virtual machine analyzes the binary code of the computer file, translates this binary code into instructions, fetches instructions from the code one-by-one and executes these instructions. The virtual machine also uses data previously obtained from the header in step 114 to implement these instructions. In one particular embodiment, the virtual machine follows a standard Intel format for the instructions, e.g., and Intel x86 specification.

In one optional embodiment of the present invention, an optimization is implemented whereby the virtual machine implements and analyzes a first subset of all the instructions encountered in order to determine if that subset of instructions shows a recognizable virus signature. For example, the virtual machine may look at the first 120 instructions.

Data Structures

FIG. 2 shows a variety of malware behavior flags that are used to indicate whether a particular file might be malware. A corresponding function in the virtual machine is used during dynamic analysis in a particular situation (described below) to determine whether a listed condition has occurred or not. The corresponding flag is set if the condition has occurred and is reset if the condition did not occur. Eight flags and their corresponding functions are described with reference to step 122; of course, more are possible.

FIG. 4 shows the format of an API list 404 that may be embodied in a database used in conjunction with the virtual machine of the present invention (for example, in the Rule file). List 404 includes any number of API name strings that have been determined to be indicative of malware; the block includes a single line data structure as shown for each particular API name string. For example, a single line may be: "GetVersionExA", 0x00, 0x01. The first value is the API name string, and the second value is the API type in hexadecimal, an unsigned long value having 32 bits available for use. The third value is the argument quantity (also in hexadecimal), indicating how many arguments are used for that particular routine call.

FIG. 5 shows a list of API types that have been found to be indicative of malware. Column 408 shows the type number in hexadecimal notation; column 412 shows the particular bit that is set, and column 416 describes the API type. Bits 27-30 are reserved for future use. Each API name string that is found used in an instruction of the suspect computer file is categorized as one of these API types. These types are explained as follows.

"Excluding API": if the suspect file contains the API it is set; then the algorithm will ignore the scan result. "Mail" represents the APIs related to e-mail operations. "Profile I/O" represents APIs that write or read profiles from the operating system. "System Information" represents the APIs that access system information. "Resource" represents the APIs that read from the system or write to resources in the system. "Console Mode" represents the APIs related to the console mode program. "Mutex" represents the APIs related to mutex object operations. "Memory Allocate" represents the APIs related to allocating memory from the system. "Environment Strings I/O" represents the APIs that read/write the environment string from the operating system. "Critical Section I/O" represents the APIs related to critical section object operations. "Timer I/O" represents the APIs that can be access timer object I/Os. "Shall Execute" represents the APIs related to the shall operation. "Net I/O" represents the APIs related to accessing the Internet or sockets. "Net Search" represents the APIs that can be search objects in the network. "Service I/O" represents the APIs related to read/write service from the operating system. "Service Search" represents the APIs that can enumerate a service from the operating system. "Registry I/O" represents the APIs related to registry key read/write in the operating system. "Registry searching" represents the APIs that can query registry keys from the operating system. "Process I/O" represents the APIs that can read/write processes from the operating system. “Process Search” represents the APIs that can enumerate processes from the operating system. “API Searching” represents the APIs that can query an API. “Load Library” represents the APIs that can load specified libraries. “Set/Get File Attribute” represents the APIs can be set/get file attributes. “File/directory I/O” represents the APIs related to the file system I/O. “Directory/File searching” represents the APIs that can search files/folders from the file system. “Get Version” represents the APIs that can get versions of the operating system.

FIGS. 6A-6D illustrate an embodiment of an API list of the present invention. The block starts with a tag as shown and ends with a corresponding tag at the end. The list includes many API names separated into API types; each record includes an API name, an API type and an argument quantity as discussed above with reference to FIG. 4. Each API type expresses a specific behavior of a group of API names; the API names in this group have different functions but each has a similar behavior. Each API type is a DWORD value; it has 32 bits and each bit represents a different type of an API.

Figure 8:
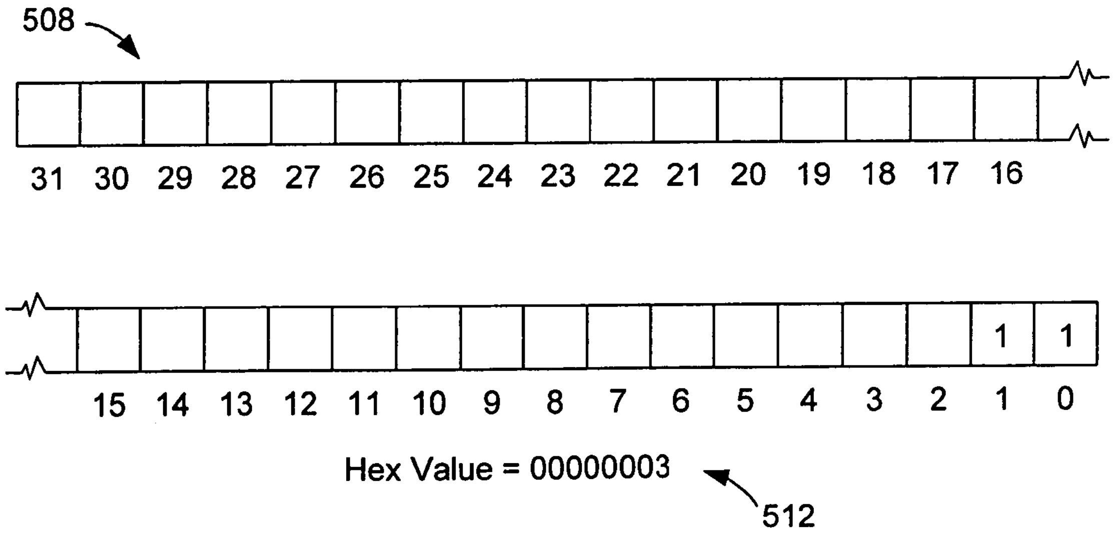
FIG. 8 shows a variable Static Behavior word and its corresponding hexadecimal value.
Figure 9:
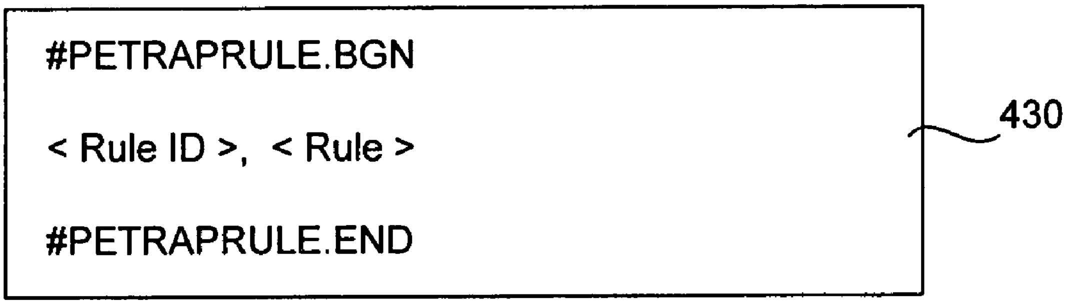
FIG. 9 illustrates the format of a rule set list.

FIG. 9 illustrates the format of a rule set list 430. In one embodiment of the invention, the rule set list is also stored in the Rule file. Each entry in the list includes a rule identifier or rule number followed by the actual rule which is a hexadecimal number. Each rule defines the behavior of a potential type of malware by setting a bit in a particular position in the same way that the API type word is configured. If a particular worm exhibits three types of behavior that are represented by three different API types, each of these three bits a set in a particular rule and collectively represents the behavior of that warm. For example, many computer viruses usually look for a file to infect, so they often call the API's “FindFirstFileA”, “FindNextFileA” and “WriteFile.” By reference to the API list we determine that the API type of the first two calls is type 1 (namely bit 0), and that the API type of the third call is 2 (namely bit 1); thus by performing an OR operation on these two values we come up with a rule whose hexadecimal value is 000000011 (see FIG. 8).

Thus, each hexadecimal value for a rule in the rule set defines the possible behavior of a particular malicious software program by setting bits in the hexadecimal word that correspond to API types that the software typically uses. Creation of the rules in the rule set may be performed in any suitable manner. By way of example, a service engineer or other expert in computer virus or worm analysis is able to analyze malicious software and to determine which API types the malicious software uses.

When the variable Dynamic Behavior is compared to each rule in the rule set an exact match indicates that the suspect computer file is exhibiting exactly the behavior that known malicious software exhibits.

FIG. 12 is a rule set example 504 that lists five example rules. These rules characterize the behavior of a particular file. For example, the rule “0x00a02092” means the file has the following behaviors: File/Directory I/O; API search; Registry search; Shell execute; Mail; and Profile I/O.

Figure 10:
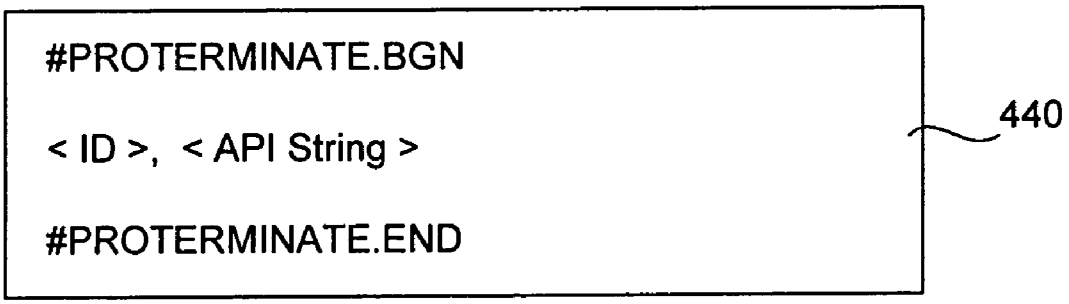
FIG. 10 illustrates the format of a program terminate list.

FIG. 10 illustrates the format of a program terminate list 440. Each entry in the list includes a numerical identifier and an API name string. When the virtual machine encounters an API name utilized by the suspect computer file and that name matches an API in this list the virtual machine will stop emulating instructions. FIG. 13 is an example of a list of terminating API names 508. Because one of these API names will cause the suspect file to terminate the virtual machine will terminate also.

Figure 11:
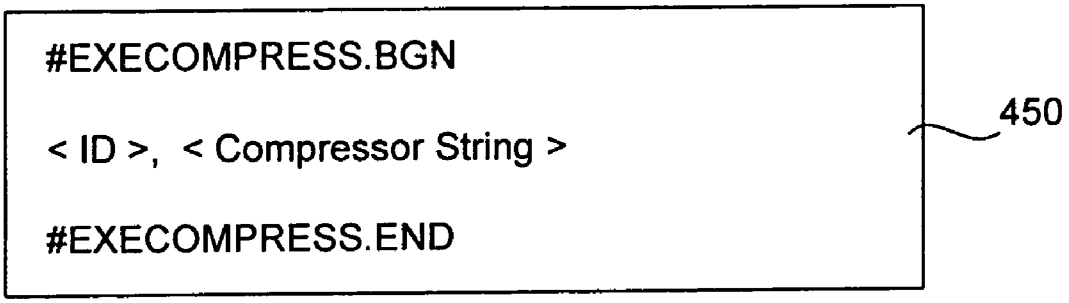
FIG. 11 illustrates the format of a compress list.

FIG. 11 illustrates the format of a compress list 450. By way of background, it is noted that a Packer program is sometimes used to reduce the file size of an executable program so that the file can be transmitted more efficiently over a network. When an executable file is compressed using a Packer program, the Packer program usually places its own marker in the PE header of the executable program.

FIG. 14 is a list of markers 512 used in many of the Packer programs. Because the behavior of many of the Packer programs are similar to that of a computer virus or other malware, this list is used by the virtual machine to detect when a Packer program has been used so to not generate a false alert.

Dynamic Scan

A first phase of the virtual machine performs a dynamic analysis of the suspect computer file. Step 122 is a dynamic scan in that the API behavior for the suspect computer file is monitored dynamically as each instruction is executed in the virtual machine. For example, instructions such as CALL and JMP are monitored to determine which memory address is being accessed. As each instruction makes a call to a software routine using an API the present invention operates to analyze the memory address utilized to determine if the address is a pointer to a dynamic link library (DLL). For example, the virtual machine checks to see if the memory address is located in the import table or not. Once it is determined that a software routine is being called, the routine name (or API name) is determined using the DLL.

Next, the API name is checked to see if it is present in the API List of the Rule file. If so, a count corresponding to that particular API type is noted. Determination of an API type based upon the API name string is further described in FIGS. 4 and 5.

More specifically, the import table is used to determine an API name. The import table is a table that contains all of the API names and addresses of the corresponding DLL and is generated by the compiler. From the import table the import directory entry can be determined. Many import directories may be present, each including 20 bytes. Each directory corresponds to a single import DLL. The virtual machine keeps track of these import directories while emulating the 32-bit instructions. The virtual machine uses the memory address following each instruction to determine a corresponding API name stored in the suspect file.

The scan engine keeps track of which API types are utilized by the suspect computer file in the course of emulating each instruction in the virtual machine. For example, the scan engine keeps track of which API type is used at least once by the suspect computer file. Keeping track of or counting these API types may be performed in any suitable manner. In one particular embodiment, a 32-bit dynamic API behavior count variable (named “Dynamic Behavior”) is used to keep track of the API types used. The initial value of this variable is zero. Once an API name is determined by the virtual machine as being utilized by the suspect computer file it is compared to the API names in the API list. If there is a match, then a bit-wise OR is performed with the API type and the Dynamic Behavior variable. In this fashion, the Dynamic Behavior variable keeps track of which API types are being utilized by the suspect file.

For example, if the virtual machine determines that an API having the name “FindFirstFileA” is used by the suspect file, it is determined that its API type is 0x0001. Performing a bit-wise OR with the variable Dynamic Behavior (initially having a value zero) results in Dynamic Behavior=1. This variable now indicates that the suspect computer file exhibits the specific behavior of seeking files. Each time that the virtual machine detects usage of a particular API name the virtual machine determines the corresponding API type and performs the OR operation with the current value of the variable Dynamic Behavior. In this fashion the variable keeps a running tally of all the different types of suspect APIs that the suspect computer file is utilizing.

Figure 7:
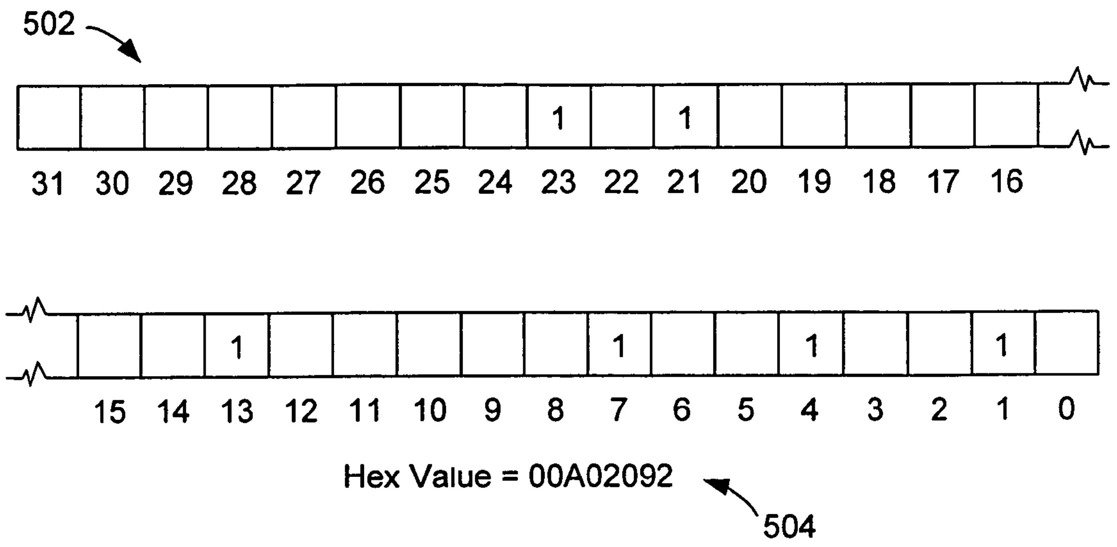
FIG. 7 shows an example Dynamic Behavior variable.

FIG. 7 illustrates another example. FIG. 7 shows an example Dynamic Behavior variable 502. In this example, the suspect computer file has called routines that correspond to API types "Mail" (bit 23), "System Information" (bit 21), "Shell Execute" (bit 13), "Registry Searching" (bit 7), "API Searching" (bit 4), and "File I/O" (bit 1). These bits are then set in the Dynamic Behavior word 502; calling any number of routines corresponding to a particular API type still results in only the single bit being set for that particular type. As shown, the hexadecimal value 504 corresponding to the word is "00A02092." The behavior count word for this particular suspect computer file thus represents certain types of API routines that are called by that computer file and may be an indication that the computer file is malware.

Once the dynamic behavior variable has been determined it is stored for later comparison to the rule set in step 130. The format of a rule set is described above with reference to FIG. 9.

Determining whether particular conditions occur during execution of the suspect computer file also occurs during the dynamic scan. As mentioned above, the malware behavior flags of FIG. 2 are set or reset according to the following analysis.

Flag 204 is set during instruction emulation if the virtual machine determines that a combination of instructions in the suspect computer file has exhibited Ring 0 calling behavior.

The virtual machine first notes if the instructions PM or MSW are executed and keeps a notation if so. Next, if either the instruction "INT n" or ESC is executed this behavior constitutes a Ring 0 calling behavior and the flag 204 is set.

Flag 208 is set if, upon loading of the suspect computer file, it is determined that the entry point is found within the last section. In other words, while the virtual machine is emulating the first instruction, it is determined whether the entry point is located in the latest section or not. If so, then flag 208 is set.

Flag 212 is set if during execution of the instructions in the virtual machine it is determined that the suspect computer file is reading data from kernel32.dll in memory. Flag 216 is similar to the previous flag in that it is dependent upon an instruction reading from kernel32.dll in memory. But, this function more precisely determines whether or not the address is within the export table. If so, then flag 216 is set. Flag 220 is set if the virtual machine generates a dump buffer but no virus signature was found in the first subset of instructions. In other words, this flag signals whether the suspect computer file has attempted to decode data from memory. Flag 224 is another mechanism used to determine whether the suspect computer file has attempted to decode data from the stack. If the virtual machine has dumped this data then flag 224 is set. Flag 228 is set or reset during operation of the PE Loader. When the PE Loader is processing the import directory from the suspect file flag 228 will be set if the PE Loader cannot find the end of the import directory. If the suspect computer file has a relocation table, the next function will check the relationship between the data in the relocation table and the instructions. If any inconsistencies are found then flag 232 is set.

Static Scan

Once step 122 has finished, step 126 operates to perform a static scan of API behavior. As is known in the art, an executable file (and in particular, an executable file in PE format) stores API names within its code. A file in PE format stores API names in an import table. Step 126 scans this import table and retrieves all of the API names present. Similar to step 122, these API name strings are then mapped to API types and a corresponding static API Static Behavior variable is created. FIG. 8 shows a variable Static Behavior word 508 and its corresponding hexadecimal value 512. In this simple example, the import table contains the API name strings "FindFirstFileA", "FindNextFileA" and "Write File." The first two strings correspond to the "Directory/File Searching" type and the third string corresponds to the "File/Directory I/O" type. The respective bits, bit 0 and bit 1, are then set in the variable Static Behavior. Thus, Static Behavior for this static scan of API behavior represents API types used by the suspect computer file that might be an indication that the file is malware.

The advantage of static API analysis is that it is fairly simple to get all of the APIs used. Because some malicious software might attempt to hide the API information from an import table analysis, it is useful to also perform a dynamic analysis as described above. The advantage of a dynamic analysis is that it can determine the exact API behavior during a run-time emulation.

Malware Detection

Step 130 is a decision step that determines whether the suspect computer file is malware depending upon various inputs. Input is the Dynamic Behavior variable, the Static Behavior variable and the various malware behavior sensor flags shown in FIG. 2. If step 130 determines that malware is present than it is able to send out a malware alert message.

First, both the Dynamic Behavior and the Static Behavior variables are compared against each rule in the rule set to determine if there is a match. Existence of a match is evidence of high risk behavior and the suspect computer file is treated as possible malware. The result from the dynamic analysis has higher priority than the result from static analysis; therefore, even if there is no match for the Static Behavior variable, a match for the Dynamic Behavior variable will still indicate the presence of malware.

Other high risk behaviors that indicate the presence of malware include: flag 204 is set; flag 232 is set; flag 228 is set and flag 220 is set; flag 224, flag 212 or flag 216 is set, and, flag 208 is set. Of course, other permutations of malware behavior flags being set and rules being matched by either of the behavior variables can also indicate that the suspect computer file is likely to be malware.

If step 130 determines that the suspect computer file is likely to be malware, then in step 138 an alert message is sent by the scan engine. The scan engine will then send an appropriate alert to the corresponding software product that can then alert the user. If step 130 determines that there is no risky behavior present and thus the suspect computer file is not likely to be malware, then in step 134 the scanning will end.

Computer System Embodiment

Figure 15A:
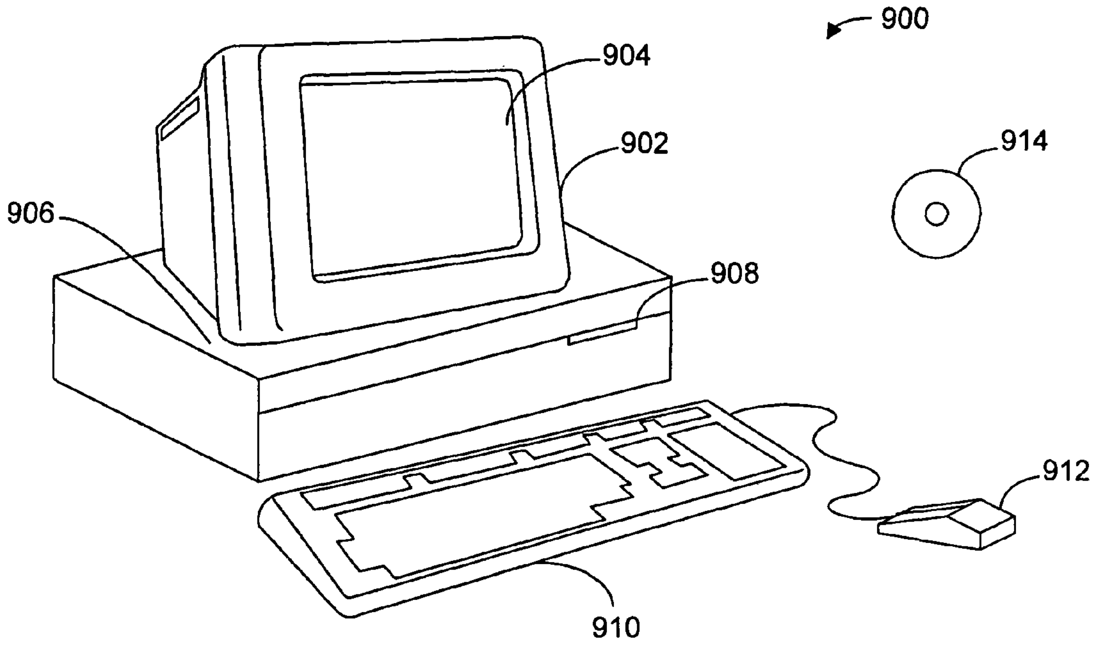
FIGS. 15A and 15B illustrate a computer system suitable for implementing embodiments of the present invention.
Figure 15B:
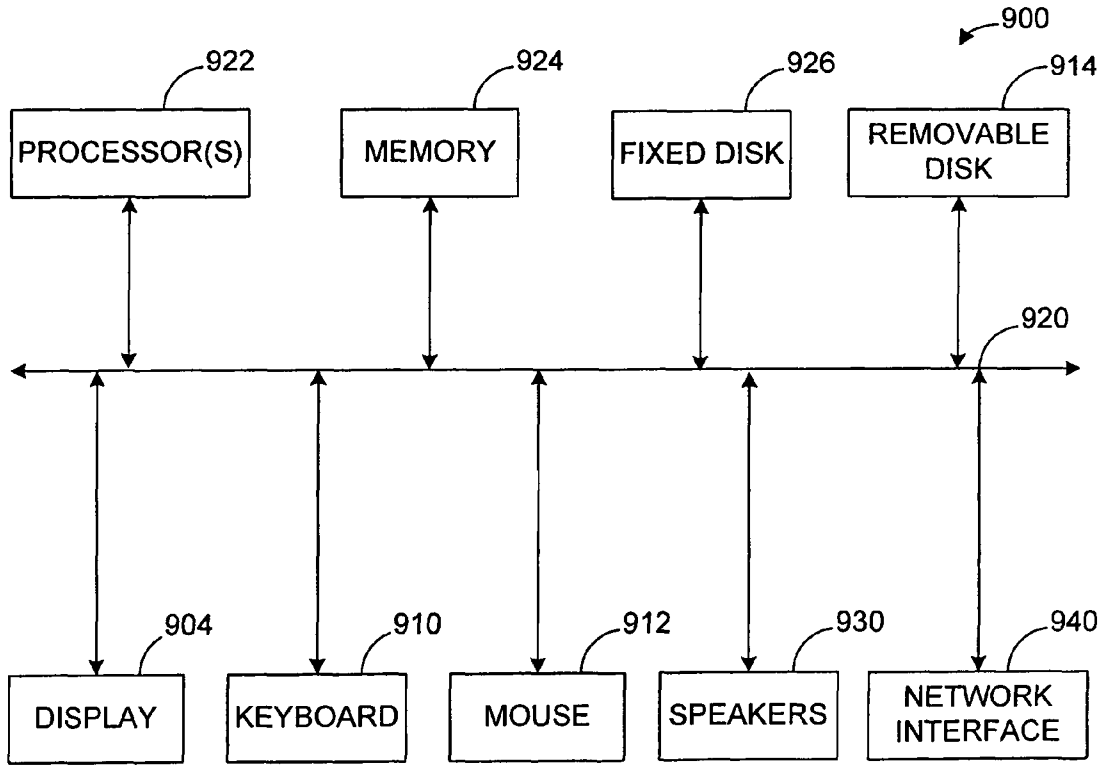

FIGS. 15A and 15B illustrate a computer system 900 suitable for implementing embodiments of the present invention. FIG. 15A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 15B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A method of detecting malware comprising:

receiving a suspect executable computer file at a computer;

loading said executable file into a virtual machine arranged to emulate instructions of said executable file;

emulating said instructions of said executable file using said virtual machine, said emulating performed by said computer;

keeping track of names of application programming interfaces (APIs) used by said executable file during said emulating, said APIs having different function, said names being stored in a memory of said computer;

determining types of APIs used by said executable file based upon said determined names of APIs used, wherein each of said types of APIs represents a behavior of a group of said API names, and wherein said determining is executed by said computer;

comparing said types of APIs used with a set of known behaviors, each known behavior including a list of API types used by malware;

making a determination that said executable file is malware based upon said step of comparing, wherein said comparing and said determination are executed by said computer; and generating a malware alert when it is determined that said executable file is malware.

2. A method as recited in claim 1, further comprising:

analyzing a header of said executable file to determine information useful in said step of keeping track.

3. A method as recited in claim 1 wherein said set of known behaviors includes a set of rules, each rule listing types of APIs used by kinds of malware.

4. A method as recited in claim 1 wherein said suspect executable computer file is an executable file in portable executable format (PEF).

5. A method as recited in claim 1 further comprising:

setting a behavior flag if a suspect condition occurs during said emulating; and determining that said executable file is malware also based upon said behavior flag.

6. A method as recited in claim 1 wherein said virtual machine is implemented by a virus scan engine.

7. A method as recited in claim 1 wherein emulating said instructions of said executable file further comprises:

monitoring API behavior; and analyzing memory addresses during said monitoring to determine if said memory addresses point to a dynamic link library such that said names of APIs can be determined.

8. A method as recited in claim 1 further comprising:

examining an API list to determine an API type.

9. A method as recited in claim 1 wherein keeping track of names of APIs further comprises:

utilizing an API behavior count variable to keep a running count of different types of APIs used by said executable file.

10. A method as recited in claim 9 further comprising:

setting a bit in said API behavior count variable, wherein said bit corresponds to a specific API type.

11. A method as recited in claim 1 further comprising:

categorizing said names of APIs into said types of API, wherein an API type represents an API group behavior and each API name in an API category has said group behavior.

12. A method of detecting malware comprising:

receiving a suspect executable computer file at a computer;

loading said executable file into a scan engine arranged to detect malware, said executable file being stored in a memory in said computer;

setting a behavior flag if a suspect condition is present in said executable file;

scanning said executable file to determine names of application programming interfaces (APIs) used by said executable file, said API in a group having different functions, said scanning performed by said computer;

determining types of APIs used by said executable file based upon said determined names of APIs used, wherein each of said types of APIs represents a behavior of a group of API names and wherein said determining is executed by said computer;

comparing said types of APIs used with a set of rules, each rule including a list of API types used by malware;

making a determination that said executable file is malware based upon said behavior flag and said step of comparing, wherein said comparing and said determination are executed by said computer; and generating a malware alert when it is determined that said executable file is malware.

13. A method as recited in claim 12, further comprising:

analyzing a header of said executable file to determine said names of said APIs.

14. A method as recited in claim 12 wherein said suspect executable computer file is an executable file in portable executable format (PEF).

15. A method as recited in claim 12 wherein said step of scanning scans an import table.

16. A method as recited in claim 12 further comprising:

monitoring API behavior; and analyzing memory addresses during said monitoring to determine if said memory addresses point to a dynamic link library such that said names of APIs can be determined.

17. A method as recited in claim 12 further comprising:

examining an API list to determine an API type.

18. A method as recited in claim 12 wherein scanning said executable file to determine names of APIs used by said executable file further comprises:

utilizing an API behavior count variable to keep a running count of different types of APIs used by said executable file.

19. A method as recited in claim 18 further comprising:

setting a bit in said API behavior count variable, wherein said bit corresponds to a specific API type.

20. A method as recited in claim 12 further comprising:

categorizing said names of APIs into said types of API, wherein an API type represents an API group behavior and each API name in an API category has said group behavior.

21. A method of detecting malware comprising:

receiving a suspect executable computer file at a computer;

loading said executable file into a virtual machine arranged to emulate instructions of said executable file;

emulating said instructions of said executable file using said virtual machine, said emulating performed by said computer;

keeping track of names of application programming interfaces (APIs) used by said executable file during said emulating, said APIs having different functions, said names being stored in a memory of said computer;

scanning said executable file to determine names of application programming interfaces (APIs) used by said executable file;

determining types of APIs used by said executable file based upon said determined names of APIs used, wherein each of said types of APIs represents a behavior of a group of said API names, and wherein said determining is executed by said computer;

comparing said types of APIs determined during said step of keeping track and during said step of scanning with a set of known behaviors, each known behavior including an indication of API types used by malware;

making a determination that said executable file is malware based upon said step of comparing, wherein said comparing and said determination are executed by said computer; and generating a malware alert when it is determined that said executable file is malware.

22. A method as recited in claim 21, further comprising:

analyzing a header of said executable file to determine information useful in said step of keeping track and in said step of scanning.

23. A method as recited in claim 21 further comprising:

setting a behavior flag if a suspect condition occurs during said emulating; and determining that said executable file is malware also based upon said behavior flag.

24. A method as recited in claim 21 wherein said virtual machine is implemented by a virus scan engine.

25. A method as recited in claim 21 further comprising:

monitoring API behavior; and analyzing memory addresses during said monitoring to determine if said memory addresses point to a dynamic link library such that said names of APIs can be determined.

26. A method as recited in claim 21 further comprising:

examining an API list to determine an API type.

27. A method as recited in claim 21 wherein keeping track of names of APIs further comprises:

utilizing an API behavior count variable to keep a running count of different types of APIs used by said executable file.

28. A method as recited in claim 27 further comprising:

setting a bit in said API behavior count variable, wherein said bit corresponds to a specific API type.

29. A method as recited in claim 21 further comprising:

categorizing said names of APIs into said types of API, wherein an API type represents an API group behavior and each API name in an API category has said group behavior.

* * * * *